(12) United States Patent
Dörfler et al.

(10) Patent No.: US 11,245,221 B2
(45) Date of Patent: Feb. 8, 2022

(54) CONNECTION ASSEMBLY, VALVE WITH CONNECTION ASSEMBLY AND METHOD OF CONNECTING A WIRE TO A CRIMP CONNECTOR

(71) Applicant: Alfmeier Präzision SE, Treuchtlingen (DE)

(72) Inventors: Erich Dörfler, Landsberg (DE); Maximilian Schwarz, Treuchtlingen (DE)

(73) Assignee: Alfmeier Präzision SE, Treuchtlingen (DE)

( * ) Notice: Subject to any disclaimer, the term of this patent is extended or adjusted under 35 U.S.C. 154(b) by 24 days.

(21) Appl. No.: 16/807,372

(22) Filed: Mar. 3, 2020

(65) Prior Publication Data
US 2020/0287322 A1 Sep. 10, 2020

(30) Foreign Application Priority Data

Mar. 8, 2019 (DE) .................... 10 2019 106 022.2

(51) Int. Cl.
*F16K 31/02* (2006.01)
*H01R 13/58* (2006.01)
(Continued)

(52) U.S. Cl.
CPC ......... *H01R 13/5808* (2013.01); *F16K 31/02* (2013.01); *F16K 31/002* (2013.01);
(Continued)

(58) Field of Classification Search
CPC .... H01R 13/5808; H01R 4/184; H01R 4/188; H01R 43/048; H01R 12/515; H01R 43/04; F16K 31/02; F16K 31/002
(Continued)

(56) References Cited

U.S. PATENT DOCUMENTS 3,531,971 A * 10/1970 Robb .................... H01R 43/058
72/385
3,590,140 A * 6/1971 Robb .................... H01R 43/042
174/84 C
(Continued)

FOREIGN PATENT DOCUMENTS

DE 102012222570 A1 6/2014
DE 202017104440 U1 7/2018
(Continued)

OTHER PUBLICATIONS

European search report dated Jun. 15, 2020, with English translation.
(Continued)

*Primary Examiner* — Minh Q Le
(74) *Attorney, Agent, or Firm* — JK Intellectual Property Law, PA

(57) ABSTRACT

A connection arrangement has a crimp connector and a wire fixed in place in it, the crimp connector having a first and a second clamping plate, both single pieces, which in an assembled state clamp the wire between them and fix the wire in place with a tensile strength force acting in a longitudinally axial direction. Inner surfaces of the first and second clamping plate face one another at least in the assembled state are executed in a first form in the preassembled state. The first and second clamping plate fit tightly with one another and are deformed in the assembled state with a tool into a second form differing from the first that the wire, due to the deformation of the first and second clamping plates, forms at least one wave. A related valve and a related method are also disclosed.

17 Claims, 5 Drawing Sheets

(51) Int. Cl.
*H01R 4/18* (2006.01)
*F16K 31/00* (2006.01)
*H01R 43/048* (2006.01)
*H01R 43/04* (2006.01)
*H01R 12/51* (2011.01)

(52) U.S. Cl.
CPC .............. *H01R 4/184* (2013.01); *H01R 4/188* (2013.01); *H01R 12/515* (2013.01); *H01R 43/04* (2013.01); *H01R 43/048* (2013.01)

(58) Field of Classification Search
USPC ............ 251/129.01; 439/442, 445, 460, 499, 439/574, 585, 730, 741, 870, 876, 877, 439/878, 82; 72/409.06, 409.15
See application file for complete search history.

(56) References Cited

U.S. PATENT DOCUMENTS

| | | | | |
|---|---|---|---|---|
| 3,879,981 A * | 4/1975 | Richards | .............. | H01R 43/042 72/409.01 |
| 4,142,771 A * | 3/1979 | Barnes | .................. | H01R 4/184 174/84 C |
| 4,669,798 A * | 6/1987 | Daum | .................... | H01R 12/68 439/423 |
| 5,865,418 A * | 2/1999 | Nakayama | ........... | G05D 23/026 251/11 |
| 6,232,555 B1 * | 5/2001 | Besler | .................... | H01R 4/182 174/84 C |
| 7,121,307 B2 * | 10/2006 | Nasiatka | ............... | B65B 13/345 140/153 |
| 7,344,388 B2 * | 3/2008 | Kreuter | .................. | H01R 4/184 439/430 |
| 7,484,528 B2 * | 2/2009 | Beyerlein | ............. | F16K 31/002 137/596 |
| 8,992,236 B2 * | 3/2015 | Wittig | ................ | H01R 12/7088 439/82 |
| 9,267,495 B2 * | 2/2016 | Kopfer | .................... | F03G 7/065 |
| 10,103,454 B2 | 10/2018 | Hanazaki | | |
| 10,995,873 B2 * | 5/2021 | Mitzler | .................. | B60N 2/914 |
| 2005/0121636 A1 * | 6/2005 | Scott | ...................... | F16K 31/025 251/129.06 |
| 2005/0173661 A1 * | 8/2005 | Mignon | ................ | F16K 31/002 251/11 |
| 2009/0239411 A1 * | 9/2009 | Susai | ..................... | H01R 4/188 439/442 |
| 2010/0119863 A1 * | 5/2010 | Bogursky | ............. | H01R 4/188 428/603 |
| 2012/0131983 A1 * | 5/2012 | Wotton, III | ........... | B21D 39/04 72/409.19 |
| 2014/0038475 A1 * | 2/2014 | Harasawa | ........... | H01R 4/5008 439/877 |
| 2014/0263680 A1 * | 9/2014 | Jackson, Jr. | .......... | F16K 5/0652 236/101 R |
| 2015/0288081 A1 * | 10/2015 | Bean | ...................... | H01R 12/58 439/82 |
| 2016/0118723 A1 * | 4/2016 | Krach | ..................... | H01R 4/18 439/877 |
| 2019/0049033 A1 * | 2/2019 | Mitzler | .................. | F16K 1/205 |

FOREIGN PATENT DOCUMENTS

| | | |
|---|---|---|
| DE | 202017104440 U1 | 7/2018 |
| EP | 2605344 A1 | 6/2013 |
| FR | 1340586 A | 10/1963 |
| GB | 2344472 A | 6/2000 |

OTHER PUBLICATIONS

German Office Action dated Nov. 19, 2019 with English Translation.

* cited by examiner

CONNECTION ASSEMBLY, VALVE WITH CONNECTION ASSEMBLY AND METHOD OF CONNECTING A WIRE TO A CRIMP CONNECTOR

CROSS-REFERENCE TO RELATED APPLICATIONS

The present application claims benefit of German Patent Application No. 10 2019 106 022.2 filed Mar. 8, 2019, which is incorporated by reference herein.

TECHNICAL FIELD

The disclosure relates to a connection arrangement that comprises a crimp connector and a wire fixed or to be fixed in place in the crimp connector, a valve to the crimp connector and a method for connecting a wire to a crimp connector. Here, a wire is understood to be either a single filament or a single thread or a bundle of filaments executed as a braid; in particular, also a wire made from a shape memory alloy. The crimp connector comprises two clamping plates to clamp a longitudinal section of a wire, for example a wire end, between them.

BACKGROUND

In the case of tension-stressed wires, such as wires made of a shape memory alloy that shorten when energized, it is necessary to ensure, in addition to a sufficiently sturdy mechanical connection of the wire to the crimp connector, an electrical connection too, as known from DE 10 2014 115 393 B3. For this purpose, in many cases an effective positive fit in the direction of the tensile stress of the wire is sought in addition to the one attained by the clamping effect of the clamping plates. This can be attained by mounting a projection protruding from the inner side of a clamping plate on one of the clamping plates of the crimp connector that receive the wire between them and providing a recess opposite to it in the inner side of the other clamping plate. When the clamping plates are pressed together, the projection presses the wire into the recess. The manufacturing of such clamping plates with a pre-assembled projection and/or recess is costly and must be tailored to the geometry of the wire.

It is known from DE 10 2005 060 217 B4 and EP 1 664 604 B1 that a valve in which a wire made of a shape memory alloy is fixed in place to a crimp connector and the wire moves a movable valve element.

The disadvantage of the known crimp connectors is that if the clamping surfaces of the crimp connector have a smooth surface, there is the danger that the wire can slip out. Other known crimp connectors that have recesses in the preassembled state entail an additional expenditure.

SUMMARY

It is therefore the purpose of the disclosure to specify a crimp connector and a connection arrangement comprising a wire, a valve with the crimp connector and a method for connecting a wire to a crimp connector that are improved with regard to the above-mentioned disadvantages.

With regard to the connection arrangement, this purpose is fulfilled according to aspects of the disclosure; with regard to the valve, according to claim 10, and with regard to the method, according to further aspects of the disclosure.

The connection arrangement according to the disclosure comprises a crimp connector and a wire fixed in place in it. The crimp connector comprises a first and a second clamping plate—both executed as one single pieces—that firmly clamp the wire between them in an assembled state and do so with a force acting on the wire in a longitudinal axial stress direction.

The inner surfaces of the first and second clamping plate, at least facing one another in the assembled state, are executed in a first form in the preassembled state. Examples of a first form are an inner surface, especially characterized by a pattern, a flat inner surface or a uniformly bent inner surface. Expediently, the inner surfaces of the first and second clamping plate that face one another are executed at least as flat clamping surfaces in the preassembled state. In particular, in the preassembled state, the first clamping plate and the second clamping plate are largely or fully executed as flat clamping surface. In the preassembled state, the clamping surfaces have especially no projections, in particular in form of thickened materials. Within the framework of typical production tolerances, in particular for sheet metal parts manufactured, for example, from rolled sheet metal by means of laser cutting or punching and subsequent bending, a flat clamping surface should be understood as a level surface. In the assembled state, the clamping surfaces of the first and second clamping plates lie adjacent to one another. According to the disclosure, the first and second clamping plate are deformed with a tool in the assembled state in such a way to a second form differing from the first that the wire forms at least a wave through the deformation of the first and second clamping plates, wherein an amplitude of the wave is executed essentially in normal fashion with regard to the first and/or second clamping plate. In other words, the clamping effect of the crimp is increased because in each case the tool is used to insert from both sides a depression on places adjacent to each other, so that the wire is guided in wave-like fashion through the deformed areas and thus held in a more mechanically stable way.

The wire consists expediently of a harder material than the one used for the first and second clamping plates.

In the arrangement, the first clamping plate has a higher number of deformations than the second clamping plate. Moreover, the wavelength of the executed wave lies preferably in the range of 0.5 to 2 times of the combined thickness of the first and second clamping plate and the wire.

In another arrangement, the wire is further guided along a side parallel to the first and/or second clamping plate.

Expediently, the first clamping plate and/or the second clamping plate have a uniform thickness in the preassembled state, at least in the area of the clamping surface. In particular, the first clamping plate and/or the second clamping plate are uniformly thick in the preassembled state. The first clamping plate and/or the second clamping plate is or are executed especially as flat sheet metal in the preassembled state. Each one of the clamping plates can alternately be provided with one or several recesses, especially in form of depressions or openings.

In the preassembled state, the clamping plates preferably enclose an acute angle β chosen in such a way that a wire inserted into the intermediate space present between the clamping plates abuts against the clamping surfaces of the clamping platen in a target position. In the preassembled state, the first and second clamping plate can be made as one single piece from sheet metal, bent with the β angle in a connecting area between the first clamping plate and the second clamping plate.

In the arrangement, the connection arrangement comprises a crimp connector, which includes at least one pressing element. Such a pressing element can be arranged in an area of a crimp connector body located away from the clamping plates. Pressing element, crimp connector body and clamping plates can be executed as a one-piece element.

In another arrangement, the wire is an SMA wire, and the crimp connector is suitable for connecting—and especially for electrically connecting—the SMA wire to a printed circuit board, especially for a valve application.

The valve according to the disclosure comprises a connection arrangement according to the disclosure. In the arrangement, the valve has a valve housing that comprises a housing lid, a housing bottom and an intermediate housing arranged between the housing lid and the housing bottom, wherein the valve housing encloses a valve chamber. The valve housing has at least one valve opening and at least one actuating element arranged inside the valve chamber, axially movable between a closing position to close the valve opening and an opening position to release the valve opening, a wire- or band-shaped SMA element made of a shape memory alloy that serves to activate the actuating element in opening direction or stroke direction, a return element that serves to move the actuating element in closing position or return position, and a printed circuit board. To activate the actuating element, the middle section of the SMA element is fixed in place to the actuating element and its ends are directly or indirectly electrically connected to the printed circuit board so an electric current can be applied to it. At least one part of the guiding means that serve to guide the actuating element and/or the fastening elements that serve to fix the printed circuit board in place inside the valve or the valve and/or a receiving space to receive the components necessary for the electrical contacting of the printed circuit board are formed by the intermediate housing according to the disclosure.

The method according to the disclosure for connecting a wire to a crimp connector includes the following steps:
- Providing a crimp connector with a first and a second clamping plate, both executed as one single pieces,
- Inserting a wire between the inner surfaces of the first and second clamping plate facing one another, which are executed in a first form in the preassembled state, in particular at least partially, in particular largely or completely, as flat clamping surfaces, and
- Deforming the first and second clamping plate from a first form to a second form differing from the first using a tool having two clamping jaws, wherein each one of the clamping jaws has at least a projection and a depression, so that the wire develops at least one wave due to the deformation of the first and second clamping plates, wherein an amplitude of the wave is executed essentially in normal fashion with regard to the first and/or second clamping plate.

This method allows the at least partial, especially complete, introduction of at least one projection and one depression in the preassem bled state of the level clamping plates using the tool, so that the wire is held by means of the executed wave. This crimp connection is thus advantageously characterized here by an inexpensively and easily manufactured crimp connector that simultaneously establishes a connection with high clamping effect.

Expediently, the projection of the one clamping jaw of the tool engages in each case with the depression of the other clamping jaw of the tool.

In particular, the clamping jaws of the tool have in each case a one- or two-dimensional surface that is continuously wavy or jagged.

BRIEF DESCRIPTION OF THE DRAWINGS

The disclosure will now be explained in more detail with reference to the enclosed diagrams, which show.

DETAILED DESCRIPTION

Figure 1:
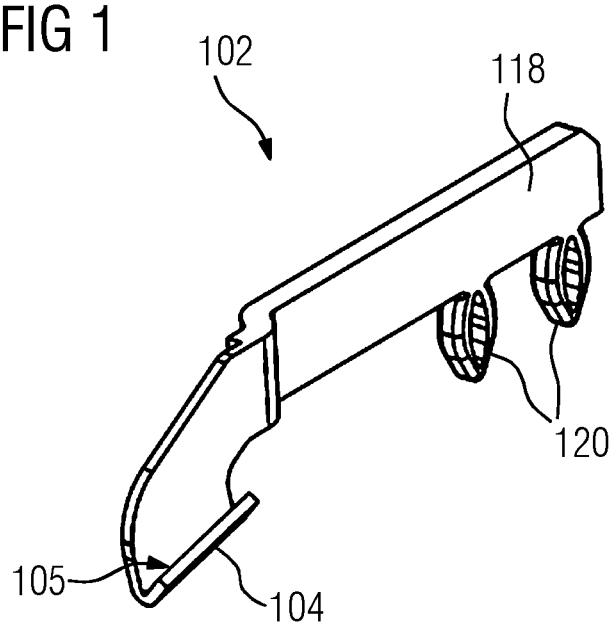
FIG. 1 is an isometric view of a crimp connector of a first arrangement in the preassembled state.
Figure 5:
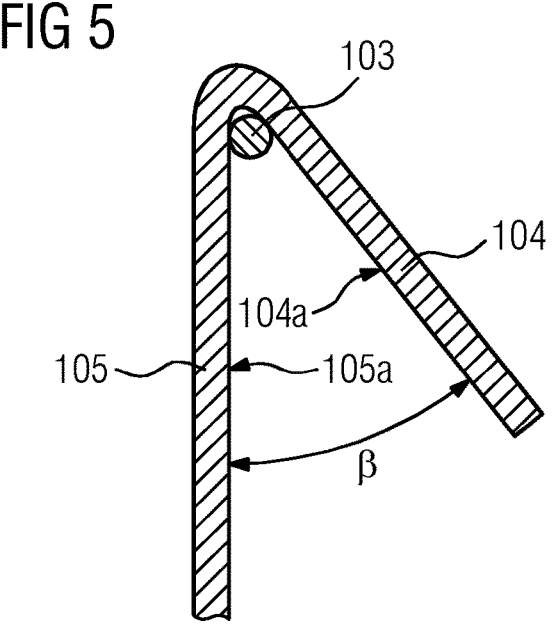
FIG. 5 is an enlarged cross-sectional view of the connection arrangement according to the first arrangement.

FIG. 1 shows a crimp connector 102 of a first arrangement in the preassembled state. The crimp connector 102 has a first clamping plate 104 and a second clamping plate 105. The first and the second clamping plate 104, 105 are executed flat with uniform thickness. The first and second clamping plate 104, 105 are executed in each case as one single piece and, in their preassembled state, enclose an acute angle β in a fold between the first and second inner (clamping) surfaces 104a, 105a of the first and second clamping plate. This acute angle β can be especially seen in FIG. 5.

Furthermore, the crimp connector 102 has a crimp connector body 118 and two pressing elements 120. In the arrangement shown, the crimp connector body 118 is thicker than in the area of the first and second clamping plate 104, 105. In an alternative arrangement (not shown), the crimp connector 118 and clamping plates 104, 105 have the same thickness. In this arrangement, the crimp connector expediently has an S-shaped bending for stabilization in the transition area. The pressing elements 120 are expediently designed as one single pieces with the crimp connector body 118.

Figure 2:
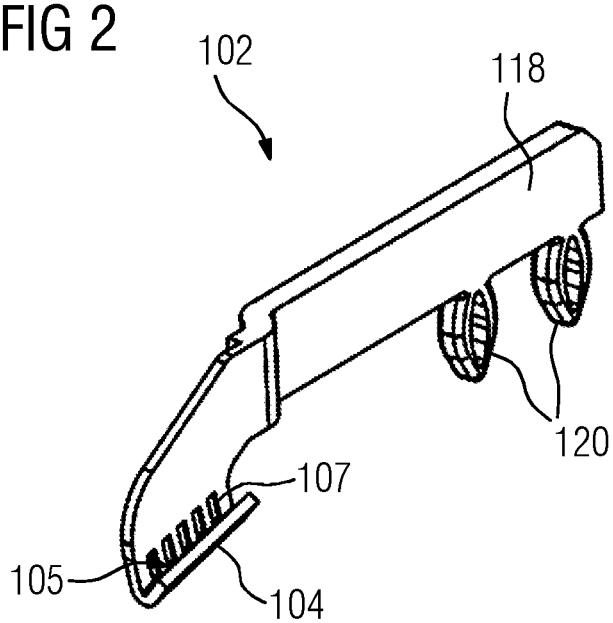
FIG. 2 is an isometric view of a crimp connector of a second arrangement in the preassembled state.

FIG. 2 shows a second arrangement of a crimp connector 102, in which—contrary to the first arrangement—recesses 107 have been arranged in the connecting area of the first and second clamping plate 104, 105. Thus, the clamping surfaces have a partially flat design here. The recesses 107 are designed as rectangular depressions. The depressions can extend from the first clamping plate 104 through the fold to the second clamping plate 105. Alternately, it is also possible for a depression to be located exclusively on a clamping plate. In an alternate arrangement, the recesses can also be designed as openings.

Figure 3:
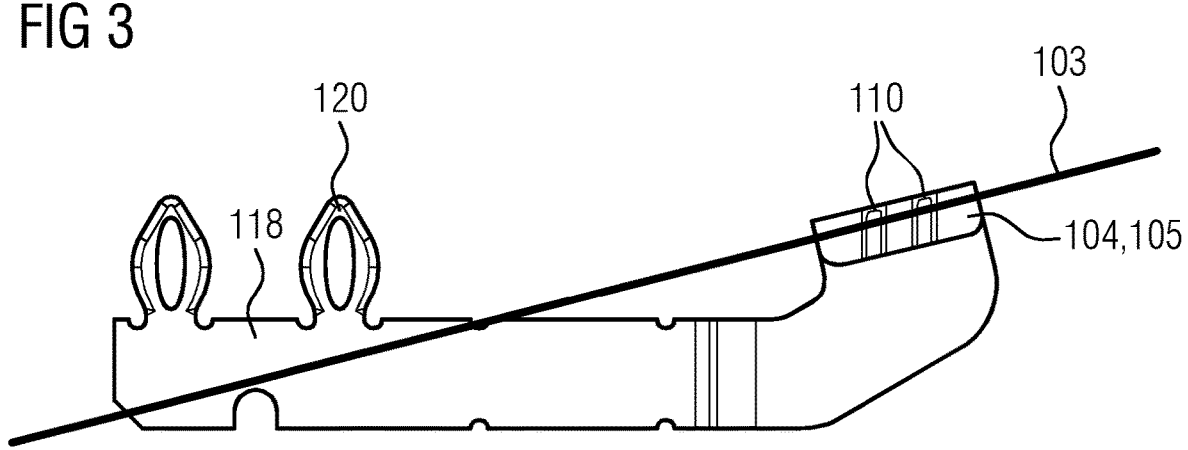
FIG. 3 is a side view of a connection arrangement with a crimp connector of the first arrangement in the assembled state.
Figure 4:
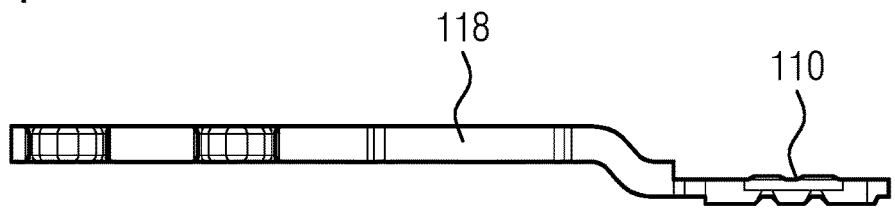
FIG. 4 is a bottom view of the connection arrangement shown in FIG. 3.
Figure 6:
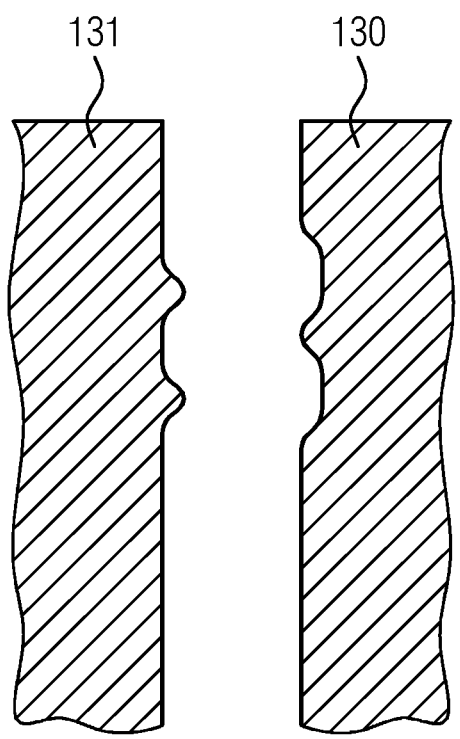
FIG. 6 is a cross-sectional view of a crimping tool.
Figure 7:
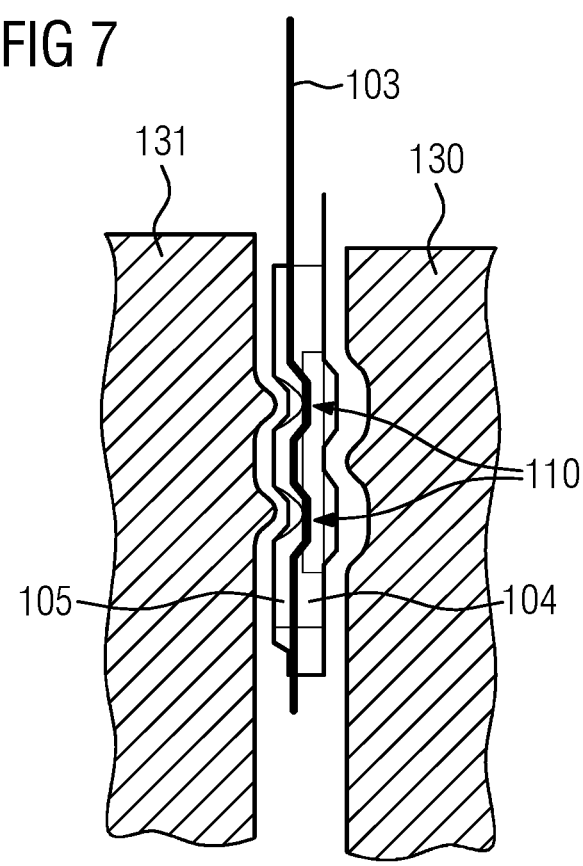
FIG. 7 is a cross-sectional view of the crimping by the crimping tool.

FIGS. 3 and 4 show two views perpendicular to one another of the assembled state of a connection arrangement 101 according to the first arrangement. The connection arrangement 101 comprises a crimp connector 102 and a wire 103. The wire 103 is jammed between the first clamping plate 104 and the second clamping plate 105. The first and the second clamping plate 104 and 105 are jammed with a tool having a first clamping jaw 130 and a second clamping jaw 131. Such clamping jaws 130, 131 are shown in FIG. 6. The clamping jaws 130, 131 have in each case a surface profile that includes projections and depressions, wherein the projection of the one clamping jaw engages with a depression of the other clamping jaw. This tool is used to jam the first and second clamping plate 104, 105 with a wire 103 lying in between. This crimping process is shown in FIG. 7, in which the first and second clamping plate 104, 105 is arranged with the introduced wire 103 between the clamping jaws 130, 131. According to this crimping process, i.e. in the assembled state, the clamping plates 104, 105 have waves 110 as shown in FIGS. 3 and 4.

Figure 8:
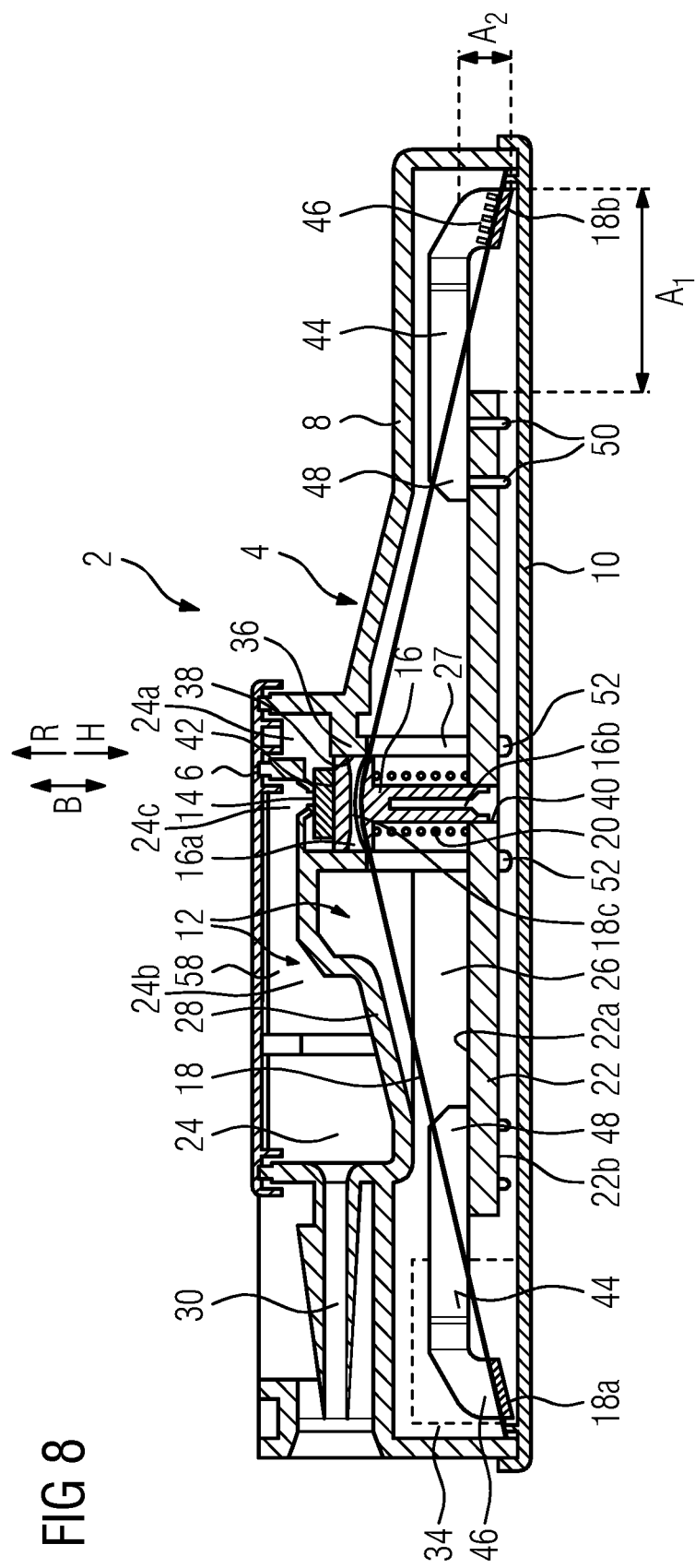
FIG. 8 is a cross-sectional view of a first valve with the connection arrangement of the first arrangement.

FIG. 8 shows a valve 2 with a valve housing 4 consisting of an upper housing lid 6, a lower housing bottom 10 and an intermediate housing 8 arranged between the housing lid 6 and the housing bottom 10. The valve housing 4 encloses a valve chamber 12, in which a valve opening 14 ends. Inside the valve chamber 12, an actuating element 16—axially movable between a closing position to close the valve opening 14 and an opening position to release the valve opening 14 in a direction of movement B—has been arranged. A wire-shaped SMA element 18 made of a shape memory alloy held with a middle section 18c onto the actuating element 16, more precisely onto its first end section 16a, serves to activate the actuating element 16 in opening direction or stroke direction H. So an electric current can be applied, the ends 18a, 18b of the SMA element 18 are likewise electrically connected to a printed circuit board 22 arranged inside the valve chamber 12.

A return actuating element 20, here a coil spring that concentrically surrounds a second end section 16b of the actuating element 16 and is radially widened with regard to the second end section 16b, supports itself with a first end on the printed circuit board 22 and with a second end on the first end section 16b of the actuating element 16, serves to move the actuating element 16 to a closing position or return position R.

The intermediate housing 8 comprises all components necessary for the valve 2 to function; in other words, all parts needed for this have been integrated into the intermediate housing 8 itself, as described below.

The valve chamber 12 is subdivided into a flow chamber 24 and an activation chamber 26, separated from one another by a separating wall 28. The actuating element 16 and the components necessary for activating the actuating element 16, namely the SMA element 18, the return actuating element 20 and the printed circuit board 22, are arranged inside the activation chamber 26. The separating wall 28 is executed as one single piece with the intermediate housing 8 or molded onto it. The flow chamber 24 has a first area 24a and a second area 24b, connected to one another through a connecting duct 24c, which is closed in a closing position of the actuating element 16 and released in an opening position of the actuating element 16.

So air can be supplied to the valve chamber 12, more precisely to the flow chamber 24, their first area 24a is connected to an air supply unit or a pneumatic pump or to a pressure connection (the latter not visible in FIG. 8), which is or will be connected to the pneumatic pump through a supply line, ending indirectly or directly in the first area 24a of the flow chamber 24. By releasing the valve opening 14, the supplied air can flow through the connecting duct 24c running through the valve opening from the first area 24a to the second area 24b. The valve 2 especially serves to fill a media reservoir (not shown), which can be an air cushion of a vehicle seat with contour adjustment. To do this, the valve chamber 12—more precisely the flow chamber 24 or its second area 24b—is fluidically connected to a user connection 30 or the user connection 30 ends in the second area 24b, so that the media reservoir can be connected to the valve 2 with hoses. Both the pressure connection and the user connection 30 are formed as one single pieces with the intermediate housing 8 and do not protrude from it. Provided the valve 2 serves to release air from a media reservoir, the first area 24a of the flow chamber 24 is or can be connected to the atmosphere; when the valve opening 14 is open, air can flow out of the media reservoir or second area 24b and through the connecting duct 24c into the first area 24a and released to the surroundings from there.

Furthermore, the intermediate housing 8 has a receiving space 34 to receive the components necessary for the electrical contacting of the printed circuit board 22, such as plug-in connectors, for example, arranged in a back part of the intermediate housing 8 and merely shown in a dashed way in FIG. 8.

To guide the actuating element 16 while it is being activated, guiding means formed by the intermediate housing 8 are provided, on the one hand. The guiding means comprise one intermediate wall 36, which extends in the direction of movement B from the separating wall 28 in an area of the valve opening 14 into the activation chamber 26, and is executed as one single piece with the separating wall 28 or the intermediate housing 8. The intermediate wall 36 circumscribes a receiving space 38 for the upper, first end section 16a facing the valve opening 14. To guide the second end section 16b, guiding means have been integrated into the printed circuit board 22, specifically in form of a recess 40 executed therein, in this case a through opening, into which the second end section 16b extends both in the opening and closing position of the actuating element 16. To guide the SMA element 16, the intermediate wall 36 has recesses 27 extending in the direction of movement B.

Thus, no additional or separate guiding means shaped like additional components are necessary to also guide the actuating element 16 during an axial movement in the direction of movement B, i.e. while the actuating element 16 is being activated.

In order to reliably close the valve opening 14 in the closing position—as shown in FIG. 8—a sealing element 42 that closes the valve opening 14 and acts together with a sealing seat that surrounds the valve opening 14 is arranged on the end section 16a facing the valve opening 14.

To control the valve 2 and apply an electric current to the SMA element 18 so it can shorten and thus activate the actuating element 16, the ends 18a, 18b are electrically connected to the printed circuit board 22, actually in each case by means of a crimp connector 44. Such a crimp connector 44 is a crimp connector 102 shown in FIG. 1 or FIG. 2. The SMA element 18 is a wire 103. The ends 18a, 18b of the SMA element 18 are in each case fixed in place in a holding space 46 of the crimp connector 44 and thus make indirect contact with the printed circuit board 22 via the crimp connector 44. The crimp connectors 44 project in each case laterally with a projection $A_1$ above the printed circuit board 22 perpendicularly to the direction of movement B. Furthermore, the crimp connectors 44 extend in stroke direction H from an upper side 22a of the printed circuit board 22 and parallel to it in the direction of the housing bottom 8, thus with a projection $A_2$ starting from the upper side 22a of the printed circuit board 22 towards its underside 22b, wherein the holding space 46 of the crimp connector 44 ends at a distance from the housing bottom 10, i.e. is arranged in a free-floating way inside the valve chamber 12. A section 48 of the crimp connector 44 at a distance from the holding space 46 is electrically connected to the printed circuit board 22 via clamping means 50. Here, the section 48 can both lay flat on the upper side 22a and also be, at least partially, at a short distance to the upper side 22a. In order to achieve a tolerance-independent connection of the printed circuit board 22 or its upper side 22a, the crimp connector 44 or its section 48 is fully at a minimum distance from the upper side 22a and the crimp connector 44 is supported merely by the clamping means 50. In this case, each crimp connector 44 has two clamping means 50, in each case extending through a recess of the printed circuit board 22, executed in an essentially oval and ring-shaped way that can be elastically deformed for insertion into the recess and held therein in the assembled state in a form-fitting way. Thus, the crimp connectors 44 establish the electrical connection between the ends 18a, 18b of the SMA element 18 fixed in place thereto and the printed circuit board 22. Due to the crimp connectors 44 projecting both laterally and also in stroke direction H, an additional length of the SMA element 18—namely the length of the diagonal of an imaginary rectangle with the lateral lengths $A_1$ and $A_2$—can be used to activate the actuating element 16, thereby achieving an overall reduction of the structural height of the valve 2. The printed circuit board 22 itself is contacted with an electrical connection by a plug-in connector plugged into the receiving space 34 of the intermediate housing 8.

To fasten the printed circuit board 22 inside the valve chamber 12, the intermediate wall 36 formed in an integral way with the intermediate housing 8 has two deformable protuberances 52 formed on its front side as fastening means and in the assembled state they extend through an opening of the printed circuit board 22 and are connected in a non-detachable way to the printed circuit board 22. At the same time, the front side forms a stop surface for the printed circuit board 22.

Figure 9:
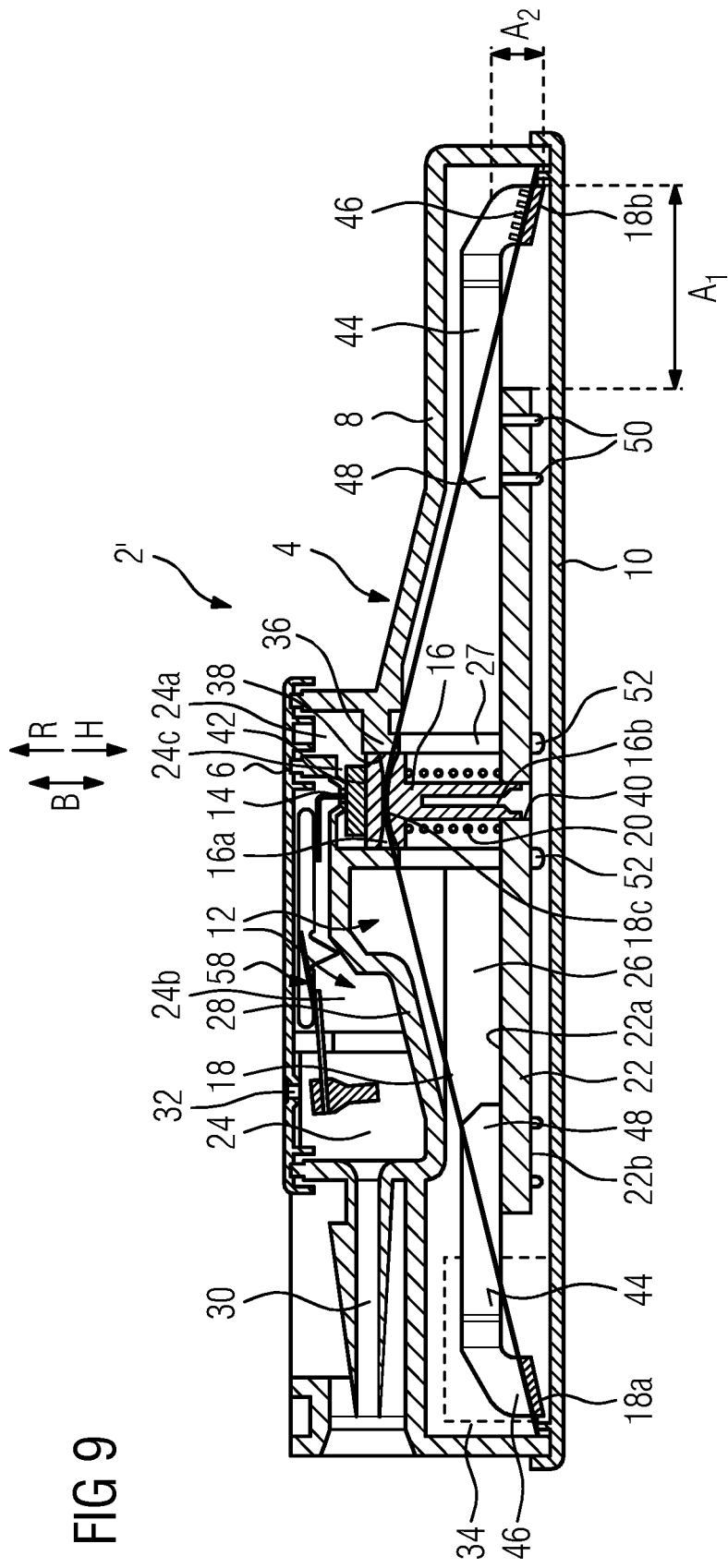
FIG. 9 is a cross-sectional view of a second valve with the connection arrangement of the first arrangement.

The valve 2' shown in FIG. 9 is exemplarily executed as 3/2-way valve and thus has another valve opening, specifically an opening 32 that connects the valve chamber 12 to the atmosphere to allow air to flow out of the valve chamber 12. Otherwise, the arrangement of the valve 2' corresponds to the valve 2 ("2/2-way valve") shown in FIG. 8, so that the individual components were provided with the same reference signs. To achieve the 3/2-way functionality, an actuator 58 has been arranged inside the valve chamber 12 or inside the flow chamber 24, pivoted on the intermediate housing 8 and operatively connected to the actuating element 16. In a section facing the opening 32, the actuator 58 has a sealing element 60 to close the opening 32. On an end section facing the actuating element 16, the actuator 58 comprises a switching finger 62 that makes contact with the actuating element 16 or fits closely on its sealing element 38. If the actuating element 16 is activated and the valve opening 14 is opened, the switching finger 62 is also moved in stroke direction owing to a return element 64, here a leaf spring, and the actuator 58 is thus rotated around its pivot, so that the opening 58 is closed by the sealing element 60. If current is no longer applied to the SMA element 18 and since the actuating element 16 is moved in return direction R owing to the return actuating element 20, the switching finger 62 is likewise moved in return direction R by the actuating element 16 or its sealing element 38. Because of this and due to a V-shaped pivot 66 of the actuator 58, the sealing element 60 opens the opening 32. If the actuating element 16 is in closing position, the opening 32 to the atmosphere is thus open and if the actuating element 16 is in release position, it is closed, thereby ensuring that the valve chamber 12 or a media reservoir is always vented when the valve 2 is not being activated. Such a 3/2-way valve is used, for example, in a vehicle seat with massage function, wherein one or more air cushions are in each case cyclically aired and vented.

| List of reference signs | |
|---|---|
| 2 | Valve |
| 4 | Valve housing |
| 6 | Housing lid |
| 8 | Intermediate housing |
| 10 | Housing bottom |
| 12 | Valve chamber |
| 14 | Valve opening |
| 16 | Actuating element |
| 16a | First end section of the actuating element |
| 16b | Second end section of the actuating element |
| 18 | SMA element |
| 18a | First end of the SMA element |
| 18b | Second end of the SMA element |
| 18c | Middle section of the SMA element |
| 20 | Return actuating element (coil spring) |
| 22 | Printed circuit board |
| 22a | Upper side of the printed circuit board |
| 22b | Underside of the printed circuit board |
| 24 | Flow chamber |
| 24a | First area of the flow chamber |
| 24b | Second area of the flow chamber |
| 24c | Connecting duct |
| 26 | Activation chamber |
| 28 | Separating wall |
| 30 | User connection |
| 32 | Opening |
| 34 | Receiving space |
| 36 | Intermediate wall |
| 38 | Receiving space |
| 40 | Recess |
| 42 | Sealing element |
| 44 | Crimp connector |
| 46 | Holding space of the crimp connector |
| 48 | Section of the crimp connector |
| 50 | Clamping means |
| 52 | Protuberance |
| 54 | Through-opening |
| 56 | Slit |
| 58 | Actuator |
| 60 | Sealing element |
| 62 | Switching finger |
| 64 | Return element |
| 66 | Pivot |
| 92 | Air gap |
| 101 | Connection arrangement |
| 102 | Crimp connector |
| 103 | Wire |
| 104 | First clamping plate |
| 104a | First clamping surface |
| 105 | Second clamping plate |
| 105a | Second clamping surface |
| 107 | Recess |
| 110 | Wave |
| 112 | Projection |
| 114 | Depression |
| 118 | Crimp connector body |
| 120 | Pressing element |
| 130 | First clamping jaw |
| 131 | Second clamping jaw |

The invention claimed is:
1. A connection arrangement comprising:
a crimp connector;
a wire fixed in place in the crimp connector;
the crimp connector movable from a preassembled state to an assembled state and including a first clamping plate and a second clamping plate executed as one single piece, in the assembled state the first clamping plate and the second clamping plate clamping the wire between them and fixing the wire in place with a tensile strength force acting in a longitudinally axial direction;

inner surfaces of the first clamping plate and the second clamping plate facing one another at least in the assembled state, the inner surfaces being executed in a first form in the preassembled state; and the inner surfaces of the first clamping plate and the second clamping plate being fit tightly with one another in a second form in the assembled state;

wherein, in the assembled state, the first clamping plate and the second clamping plate are deformed with a tool into the second form, the second form differing from the first form due to deformation of the inner surfaces of the first and second clamping plates in the second form such that the wire forms at least one wave, wherein an amplitude of the wave is executed in essentially normal fashion with regard to the first and/or second clamping plate.

2. The connection arrangement according to claim 1, wherein the inner surfaces of the first and second clamping plate facing one another are executed at least partially as flat clamping surfaces in the preassembled state.

3. The connection arrangement according to claim 1, wherein the wire is made of a material that is harder than the material of the first and second clamping plates.

4. The connection arrangement according to claim 1, wherein the first clamping plate has a larger number of deformations than the second clamping plate.

5. The connection arrangement according claim 1, wherein the wavelength of the executed wave lies in the range between 0.5 to 2 times the combined thickness of the first and second clamping plate and the wire.

6. The connection arrangement according to claim 1, wherein the wave is designed in such a way that the wire is continued, at least on one side, parallel to the first and/or second clamping plate.

7. The connection arrangement according to claim 1, wherein the first clamping plate and/or the second clamping plate have a uniform thickness in the preassembled state, at least in the area of the clamping surface.

8. The connection arrangement according to claim 1, wherein in the preassembled state, the clamping plates enclose an acute angle β chosen in such a way that a wire introduced in the intermediate space existing between the clamping plates fits closely on a target position on the clamping surfaces of the clamping plates.

9. The connection arrangement according to claim 1, wherein the connection arrangement includes a crimp connector that includes at least one pressing element.

10. The connection arrangement according to claim 1, wherein the wire is an SMA wire and the crimp connector is suitable for connecting the SMA wire to a printed circuit board.

11. A valve comprising a connection arrangement according to claim 1.

12. The valve according to claim 11, including a valve housing having a housing lid, a housing bottom, and an intermediate housing arranged between the housing lid and the housing bottom, wherein the valve housing encloses a valve chamber and has at least one valve opening, wherein inside the valve chamber there are arranged at least one actuating element, axially movable between a closing position to close the valve opening and an opening position to release the valve opening, a wire- or band-shaped SMA element made of a shape memory alloy that serves to activate the actuating element in opening direction that forms the wire, a return actuating element that serves to move the actuating element in closing position and a printed circuit board, wherein das SMA element is fixed in place to the actuating element with a middle section and is electrically connected with its ends to the printed circuit board with the crimp connector so an electric current can be applied.

13. The connection arrangement according to claim 1, wherein, in the preassembled state, the first clamping plate and the second clamping plate have a uniform thickness, at least in the area of a clamping surface of the first clamping plate and the second clamping plate, and the first clamping plate and the second clamping plate enclose an acute angle β chosen in such a way that a wire introduced in an intermediate space existing between the first clamping plate and the second clamping plate fits closely on a target position on the clamping surfaces.

14. A method for connecting a wire to a crimp connector comprising the steps of:

providing a crimp connector with a first clamping plate and a second clamping plate executed as one single piece;

inserting a wire between inner surfaces of the first and second clamping plates facing one another in a preassembled state with the inner surfaces in a first form; and deforming the first clamping plate and the second clamping plate from the preassembled state to an assembled state to cause the inner surfaces to change from a first form to a second form differing from the first form using a tool having two clamping jaws, wherein each of the clamping jaws has at least one projection and a depression, so that the wire creates at least one wave due to the deformation of the first and second clamping plates, wherein an amplitude of the wave is essentially executed in normal fashion with regard to the first and/or second clamping plate.

15. The method according to claim 14, wherein in each case the projection of the one clamping jaw engages in the depression of the other clamping jaw.

16. The method according to claim 14, wherein the clamping jaws have in each case a continuously wavy or jagged surface in one or two dimensions.

17. The method according to claim 14, wherein in the preassembled state, the first clamping plate and the second clamping plate have a uniform thickness, at least in the area of a clamping surface of the first claiming plate and the second clamping plate, and the first clamping plate and the second clamping plate enclose an acute angle β chosen in such a way that a wire introduced in an intermediate space existing between the first clamping plate and the second clamping plate fits closely on a target position on the clamping surfaces.

* * * * *